United States Patent
Ostadi et al.

(10) Patent No.: US 10,290,879 B2
(45) Date of Patent: May 14, 2019

(54) MICROVALVE

(71) Applicant: INTELLIGENT ENERGY LIMITED, Loughborough, Leicestershire (GB)

(72) Inventors: Hossein Ostadi, Loughborough (GB); Paul Leonard Adcock, Loughborough (GB); Christopher James Kirk, Loughborough (GB); Zachary Elliott, Loughborough (GB)

(73) Assignee: Intelligent Energy Limited, Loughborough (GB)

( * ) Notice: Subject to any disclaimer, the term of this patent is extended or adjusted under 35 U.S.C. 154(b) by 379 days.

(21) Appl. No.: 14/649,397

(22) PCT Filed: Dec. 4, 2013

(86) PCT No.: PCT/GB2013/053206
§ 371 (c)(1),
(2) Date: Jun. 3, 2015

(87) PCT Pub. No.: WO2014/087160
PCT Pub. Date: Jun. 12, 2014

(65) Prior Publication Data
US 2016/0064750 A1    Mar. 3, 2016

(30) Foreign Application Priority Data
Dec. 4, 2013  (GB) .................................. 1221885.5

(51) Int. Cl.
*H01M 8/24* (2016.01)
*H01M 8/2465* (2016.01)
(Continued)

(52) U.S. Cl.
CPC ......... *H01M 8/04104* (2013.01); *F16K 7/045* (2013.01); *F16K 99/0015* (2013.01);
(Continued)

(58) Field of Classification Search
None
See application file for complete search history.

(56) References Cited

U.S. PATENT DOCUMENTS 6,619,311 B2 *   9/2003   O'Connor ............. B01L 3/5025
                                                 137/109

FOREIGN PATENT DOCUMENTS

EP    1 085 219 A2    3/2001
EP    1 909 008 A1    4/2008
(Continued)

OTHER PUBLICATIONS

International Search Report and Written Opinion dated Apr. 2, 2014 in International Application No. PCT/GB2013/053206.
(Continued)

*Primary Examiner* — Daniel S Gatewood
(74) *Attorney, Agent, or Firm* — BakerHostetler

(57) ABSTRACT

A microvalve assembly (30) is integrated into a printed circuit board (PCB) substrate (31). An aperture (32) in the PCB substrate includes a closure member (33) extending into the aperture. A flexible fluid pipe (38) is disposed between the closure member and a closure edge (37) of the aperture. A displacement member (34) is coupled to the PCB and is configured for thermal actuation to displace the closure member so as to vary the cross-sectional profile of the flexible fluid pipe. The closure member may be a cantilever section of the PCB substrate. Displacement of the closure member to vary the cross-sectional profile of the flexible fluid pipe can occur entirely within the plane of the PCB substrate and movement of the displacement member to displace the closure member can also occur entirely within the plane of the PCB substrate, providing a very low profile of microvalve particularly suited for integration into a fuel cell stack (1).

18 Claims, 6 Drawing Sheets

(51) Int. Cl.
*H01M 8/04* (2016.01)
*F16K 99/00* (2006.01)
*F16K 7/04* (2006.01)
*H01M 8/04089* (2016.01)
*H01M 8/04082* (2016.01)

(52) U.S. Cl.
CPC ...... *F16K 99/0026* (2013.01); *F16K 99/0036* (2013.01); *F16K 99/0038* (2013.01); *F16K 99/0044* (2013.01); *H01M 8/04201* (2013.01); *H01M 8/2465* (2013.01)

(56) References Cited

FOREIGN PATENT DOCUMENTS

| JP | H04-136571 A | 5/1992 | | |
|----|----|----|----|----|
| JP | 2010-196710 A | 9/2010 | | |
| WO | 2006/135743 A2 | 12/2006 | | |
| WO | 2008/113180 A1 | 9/2008 | | |
| WO | 2008/121691 A1 | 10/2008 | | |
| WO | WO 2008121691 A1 * | 10/2008 | ........ | B01L 3/502738 |
| WO | 2012/117035 A1 | 9/2012 | | |
| WO | WO 2012117035 A1 * | 9/2012 | .......... | H01M 8/0228 |

OTHER PUBLICATIONS

Singapore Patent Application No. 11201504406R; Written Opinion; dated Mar. 22, 2016; 4 pages.
International Patent Application No. PCT/GB2013/053206; Int'l Preliminary Report on Patentability; dated Jun. 9, 2015; 6 pages.

* cited by examiner

MICROVALVE

CROSS-REFERENCE TO RELATED APPLICATIONS

This application is a National Stage of International Patent Application No. PCT/GB2013/053206, filed Dec. 4, 2013 and claims priority to foreign application GB 1221885.5, filed Dec. 5, 2012, the contents of which are incorporated herein by reference in their entirety.

The present invention relates to valves for controlling flow of fluids in a conduit, and in particular microvalves which can be manufactured in very small formats on a substrate.

There are many devices in which miniaturised flow control valves can be useful to control flow of fluids to, from or within the device. An example of such a device is an electrochemical fuel cell stack where, in particular, gaseous fuel flows into the stack and into individual cells within the stack may require controlling. The expression "flow control" as used herein is intended to encompass both variable control of a flow rate and on-off flow control. Typical gaseous fuel flows in a fuel cell stack that require such control may include hydrogen flows to cells in the fuel cell stack.

Various microvalve arrangements have been described in the art. For example, L Gui et al: "Exploration and evaluation of embedded shape memory alloy (SMA) microvalves for high aspect ratio microchannels", Sensors and Actuators A 168 (2011), pp 155-161 describes developments in on-chip microvalves using a shape memory alloy wire embedded in a polydimethylsiloxane substrate containing a microchannel. The shape memory alloy wire is thermally actuated to squeeze the microchannel to close the flow. The microvalve is formed on a silicon wafer. In another example, C M Pemble et al: "A miniature shape memory alloy pinch valve", Sensors and actuators 77 (1999) pp 145-148 describe a pinch valve structure mounted on a flat surface and using electrical resistance heating of a Nitinol contraction wire to cause upward deflection of a superelastic cantilever to relieve pinch pressure on silicon tubing.

It is an object of the present invention to provide a simple, low-cost microvalve that can be very compact in form. It is a further object to provide a microvalve which can be manufactured to have a very low profile form, such that it is particularly suitable for integration into a fuel cell stack.

According to one aspect, the present invention provides a valve assembly comprising:
  a substrate;
  an aperture in the substrate including a closure member extending into the aperture;
  a flexible fluid pipe disposed between the closure member and a closure edge of the aperture;
  a displacement member coupled to the substrate and configured for thermal actuation to displace the closure member so as to vary the cross-sectional profile of the flexible fluid pipe.

The substrate may be a printed circuit board substrate or a non-printed circuit board substrate. The closure member may be a cantilever extending into the aperture. The closure member may be an axially compressible member extending into the aperture. The displacement member may be configured for thermal actuation to displace the closure member so as to open and close a lumen of the flexible fluid pipe. The displacement member may comprise a tension wire connected to and extending between the closure member and a main body of the substrate, the tension wire configured to vary its length as a function of temperature. The valve assembly may include electrically conductive tracks extending along the substrate to the tension wire, to form an electrical connection therewith. The tension wire may comprise a shape memory alloy. The displacement member may be configured to shorten in length upon heating by electrical current passing therethrough. The valve assembly may include a nub projecting laterally between the closure member and the closure edge of the aperture, the nub compressing the flexible fluid pipe into a closed or partially closed configuration when the closure member is in an unbiased configuration. The valve assembly may be configured such that thermal activation of the displacement member biases the closure member away from the closure edge of the aperture such that pressure on the flexible fluid pipe is relieved and the pipe adopts an open configuration. The valve assembly may be configured such that the displacement of the closure member to vary the cross-sectional profile of the flexible fluid pipe occurs entirely within the plane of the substrate. The valve assembly may be configured such that movement of the displacement member to displace the closure member occurs entirely within the plane of the substrate. The closure member and/or the displacement member may be recessed below a major surface of the substrate.

According to another aspect, the present invention provides a fuel cell stack comprising an anode or cathode feed conduit for delivery of fuel or oxidant to cells in the stack, the feed conduit passing through a valve assembly, as described above, disposed within the stack, to control flow of fuel or oxidant to the cells within the stack.

The valve assembly may be integrated into a printed circuit board forming a current collector plate of the fuel cell stack.

Embodiments of the present invention will now be described by way of example and with reference to the accompanying drawings in which:

FIG. 2 shows schematic views of a microvalve in which FIG. 2a is a plan view of the microvalve in a non-actuated configuration, FIG. 2b is a plan view of the microvalve in an actuated configuration, FIG. 2c is a cross-sectional view through the microvalve in non-actuated configuration, and FIG. 2d is a cross-sectional view through the microvalve in actuated configuration;

FIG. 5 shows schematic views of a modification to the microvalve of FIG. 2 to use an alternative displacement actuator, in which FIG. 5a is a plan view and FIG. 5b is a cross-sectional view through the microvalve;

Figure 6:
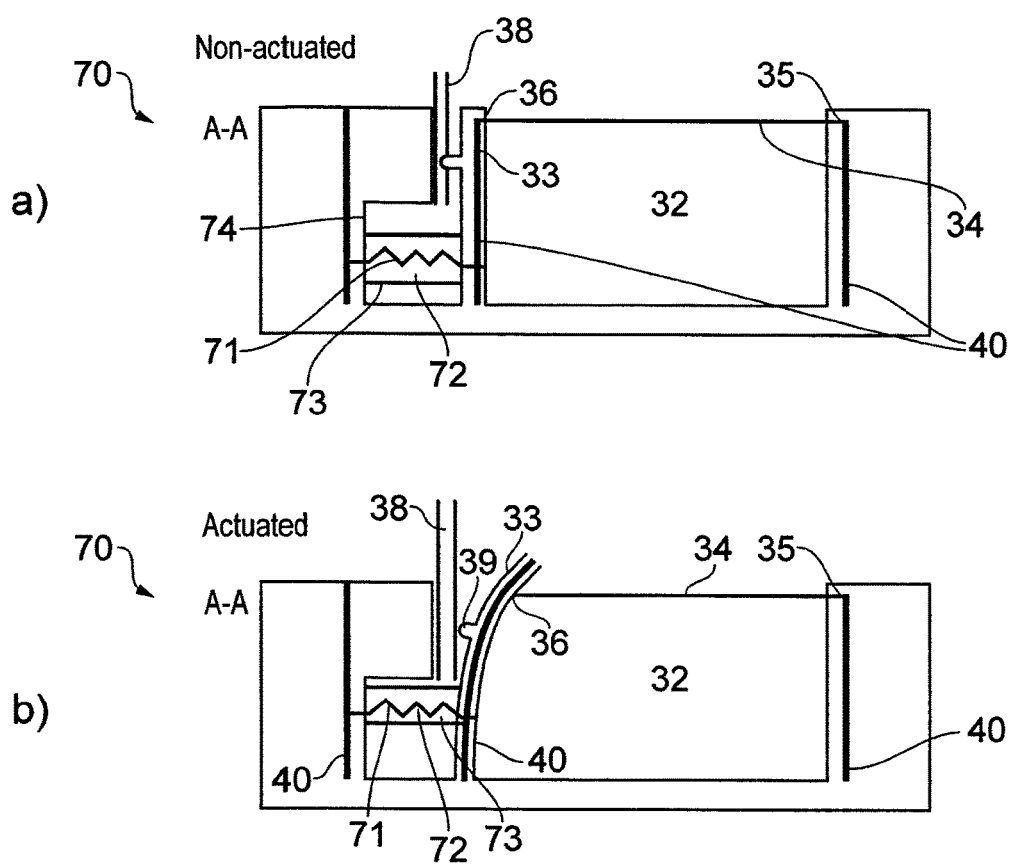
Figure 7A:
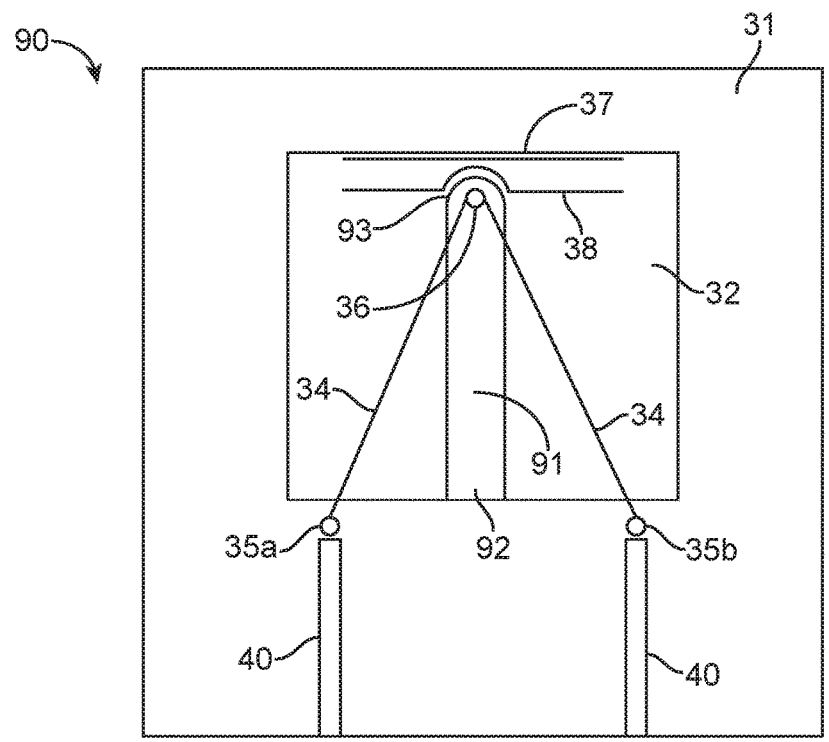
Figure 7B:
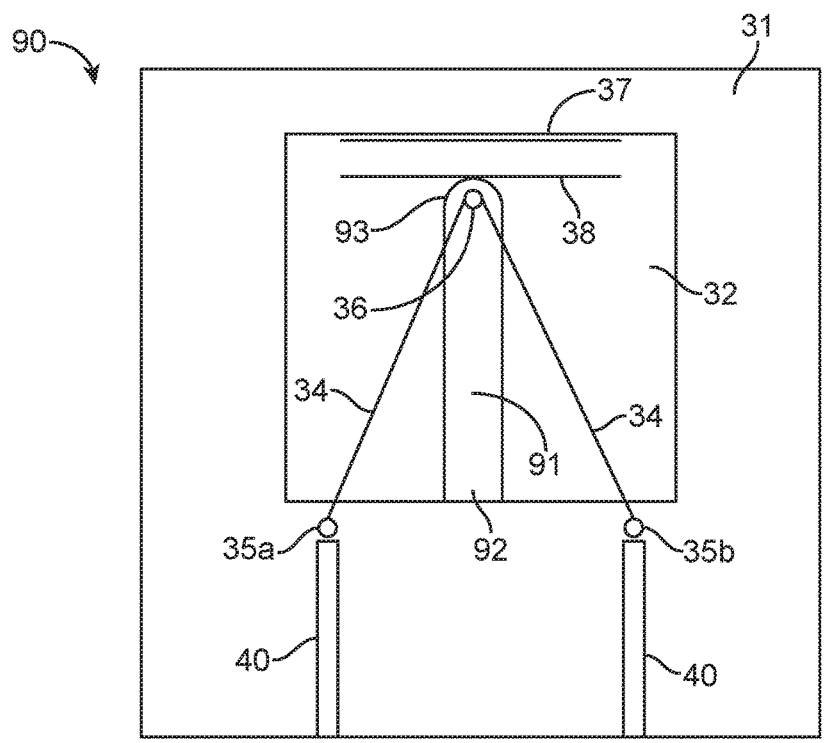

FIG. 6 is a schematic plan view of an alternative design of latching microvalve in which FIG. 6a shows the valve in non-actuated configuration and FIG. 6b shows the valve in actuated configuration; and FIG. 7 shows schematic plan views of a microvalve in which FIG. 7a is a plan view of the microvalve in a non-actuated configuration and FIG. 7b is a plan view of the microvalve in actuated configuration.

Figure 1:
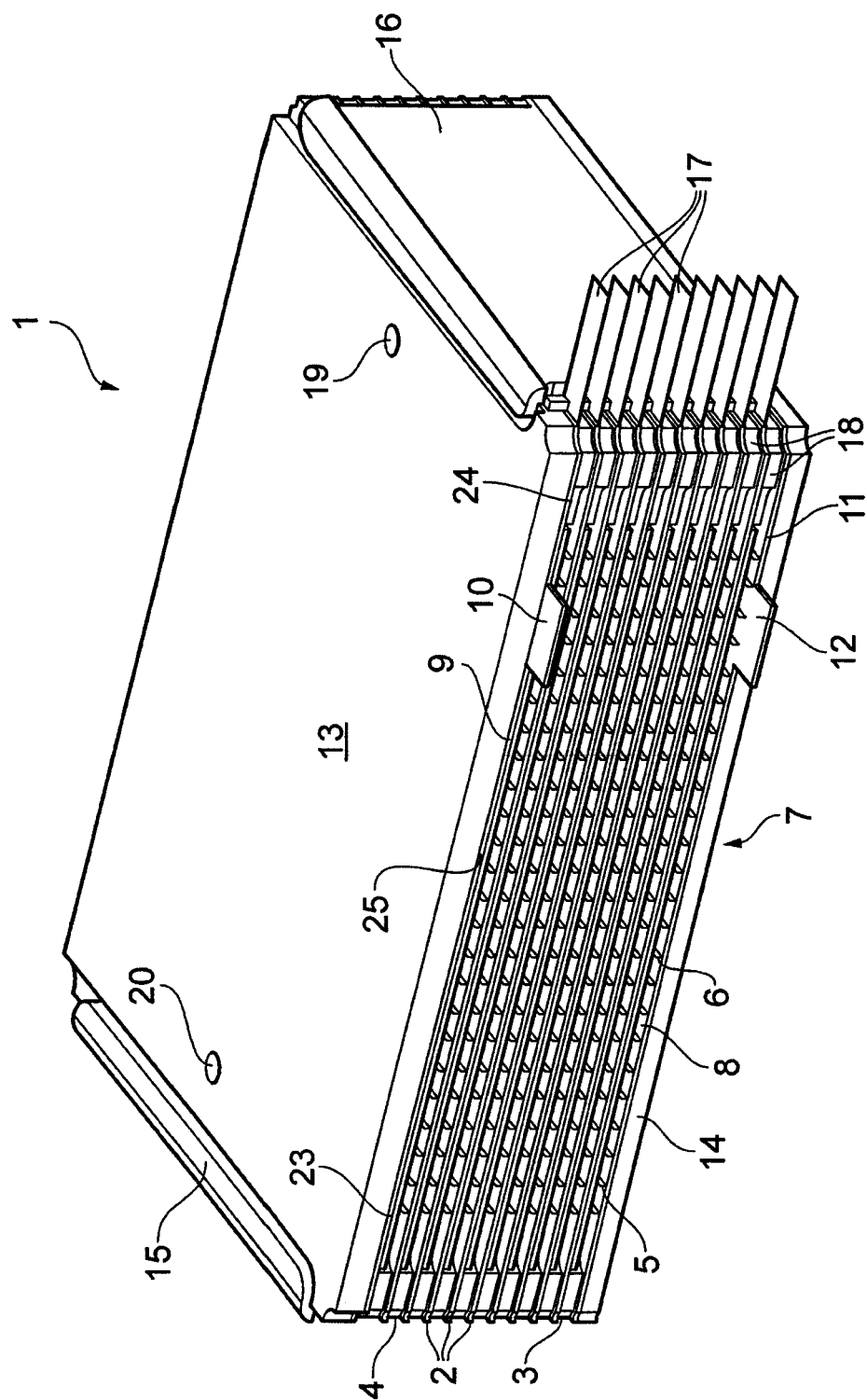
FIG. 1 is a perspective view of a compact fuel cell stack in which a microvalve of the present invention can be conveniently incorporated.

With reference to FIG. 1, a fuel cell stack assembly 1 has a plurality of parallel cells 2 each including a membrane-electrode assembly (MEA) 3 disposed between an anode flow plate 4 and a cathode flow plate 5. In the stack assembly shown in FIG. 1, the anode flow plates 4 lie horizontally above each respective MEA 3 and the cathode flow plates 5 lie horizontally below each respective MEA 3.

The fuel cell stack shown is of the air-cooled, open cathode variety in which the anode flow plates 4 are thin metal layers each having a set of flow channels etched or otherwise formed in the surface (not visible in FIG. 1) of the anode flow plate that faces the MEA, to deliver anode fuel gas such as hydrogen to the anode side of the MEA 3. A layer of porous gas diffusion material (not visible in FIG. 1) may be positioned between the MEA and the anode flow plate to assist in distributing the fuel to the MEA surface. A gasket extends around the periphery of the MEA and the anode flow plate to provide a seal to prevent escape of anode fuel.

In the example shown, the cathode flow plate 5 is of the open cathode type and is formed as a corrugated plate 6. The corrugations provide open-ended flow channels 8 for the passage of air past the surface of the MEA or gas diffusion layer disposed thereon. The front face 7 of the stack 1 as viewed in FIG. 1 provides an air inlet face by which air can be passed in the stack volume to the cathode surfaces of the MEA. The opposite face of the stack (i.e. the reverse of the stack as viewed in FIG. 1) may provide a further air inlet face. Alternatively, if the stack is force ventilated, the opposite face may be an air outlet face for egress of air that was forced into the front face 7.

At the top of the stack assembly 1, an anode current collector plate 9 includes an anode current collector tab 10 extending laterally outwardly from the stack to provide an electrical terminal to which can be attached an electrical connector. At the bottom of the stack assembly 1, a cathode current collector plate 11 includes a cathode current collector tab 12 extending laterally outwardly from the stack to provide an electrical terminal to which can be attached an electrical connector, e.g. by soldering.

The stack assembly 1 is placed under compression by way of a pair of end plates, specifically a top end plate 13 and a bottom end plate 14, which are held together by left and right end clips 15 and 16. The end clips 15, 16 are applied in tension such that the layers of the stack are held tightly compressed in order that all gaskets correctly seal against the various layers of the cells in the stack.

The stack assembly 1 may also include a series of voltage monitoring tabs 17 each extending laterally outward from respective ones of the anode flow plates or cathode flow plates. In the example shown, the voltage monitoring tabs 17 are lateral extensions of the anode flow plates. Voltage monitoring tabs may be provided for every cell in the stack or may be provided every few cells in the stack, and are useful for monitoring cell voltages throughout the stack during operation.

Gasket arrangements 18 may provide sealing of the ends of the cells in the stack and may also provide vertically extending galleries through the stack for delivery and distribution of fuel to each cell in the stack. A port 19, 20 may be provided in each end of the top plate 13 to provide fluid access to the cells below. These ports may provide access for the hydrogen fuel of a hydrogen powered fuel cell stack.

The anode current collector plate 9 may be fabricated from a printed circuit board (PCB) substrate 25 of suitable electrically insulating dielectric material such as epoxy resin with a woven or non-woven support in a laminated structure. Disposed on the underside of the PCB substrate 25 may be highly electrically conductive material such as copper which is patterned to provide a current collection electrode for the fuel cell stack and may also provide conductive tracks for electrical connection to electrical components on the collector plate 9.

The anode current collector plate 9 may include end sections 23, 24 extending beyond the electrically active area of the fuel cell stack, through which apertures are formed to provide fluid flow paths extending from ports 19, 20 in the top end plate 13 to galleries extending down through the layers of the cells 2 to provide hydrogen fuel to each plate.

It would be highly desirable to provide a flow control valve (as defined above to also encompass a shut-off valve) within the body of the fuel cell stack 1 to enable hydrogen flows to the cells to be controlled.

As will now be discussed in detail, a microvalve integrated into the printed circuit board 25, and particularly in the end sections 23, 24 thereof, would enable the hydrogen flows to be controlled within the stack 1.

Figure 2:
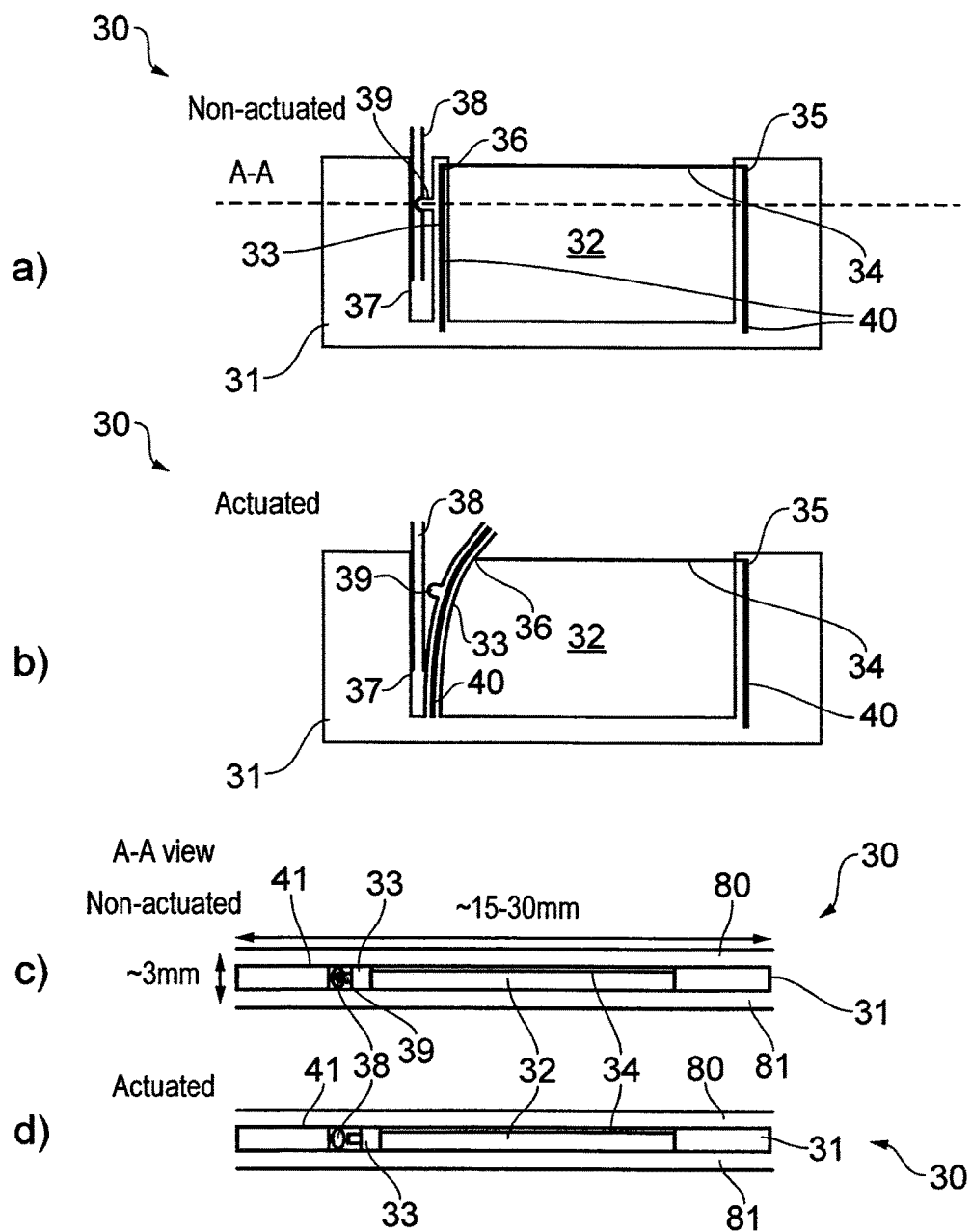

FIG. 2 shows a microvalve assembly 30 fabricated on a printed circuit board (PCB) substrate 31. FIG. 2a shows a plan view of the substrate 31 with the valve in a non-actuated configuration. FIG. 2b shows a plan view of the substrate 31 with the valve in an actuated configuration. FIGS. 2c and 2d each show a cross-section through the PCB substrate 31 respectively also showing the valve in a non-actuated and an actuated configuration.

The valve assembly 30 comprises an aperture 32 in the PCB substrate. Extending into the aperture 32 is a cantilever member 33 which is preferably an integral part of the PCB substrate 31 created during formation of the aperture 32. However, the cantilever member 33 could be fabricated separately and affixed to the PCB substrate 31 so as to extend into the aperture.

A shape memory alloy (SMA) wire 34 extends across the aperture 32 and is secured to the PCB substrate 31 at connection points 35, 36. The connection points can be any suitable type of mechanism for securing the wire 34 to the substrate 31 such as by soldered contacts or by the wire 34 looping around a structure embedded in or attached to the substrate. The wire loop could be closed by a clamp or other mechanism. Electrically conductive tracks 40 extend across the PCB substrate 31 to ends of the shape memory alloy wire 34, forming electrical connections thereto.

Disposed between the cantilever 33 and a closure edge 37 of the aperture 32 is a fluid conduit 38. The fluid conduit 38 is preferably a flexible pipe and can be compressed to restrict the flow of fluid through the pipe. The cantilever member 33 includes a nub 39 (e.g. a protuberance or boss) extending laterally outward towards the closure edge 37 of the aperture 32. The nub 39 provides a pinch point which locally compresses the pipe 38 to shut off fluid flow therethrough. Although the nub 39 is shown on the cantilever member 33, it could alternatively be located on the closure edge 37 of the substrate where the pinch point is required, or nubs 39 could be formed on the cantilever member 33 and the closure edge 37 of the aperture to work in opposition to one another.

The shape memory alloy wire 34 has a negative thermal coefficient of expansion in that it contracts significantly as its temperature rises above a certain threshold. As the SMA wire 34 contracts, the cantilever member 33 is flexed away from the aperture closure edge 37 thereby relieving pressure on the pipe 38 and opening the lumen within the pipe walls. Thermal activation of the shape memory alloy wire 34 (i.e. heating and cooling of the wire) can be effected by switching on and off electrical current through the wire, the current being delivered via the electrically conductive tracks 40. When electrical current is turned off and the wire 34 cools down, the cantilever member returns to its unbiased configuration thereby closing the lumen within the pipe walls.

The fluid conduit 38 can be fabricated from any suitable flexible, compressible tubing such as Tygon or silicone tubing. In the example shown, the flexible tubing has an outside diameter of 2 mm and is pinched between a cantilever 33 and printed circuit board closure edge 37 of thickness between 1 and 2 mm. The SMA wire 34 extends over a length of between 15 and 30 mm. Other dimensions are possible.

Various modifications can be made to the microvalve shown in FIG. 2.

The cantilever 33 could be replaced by a bridge member extending right across the aperture. However, increased flexibility of the material (e.g. the PCB material) forming the bridge may then be required in order to ensure sufficient lateral displacement of the bridge member to compress or decompress the adjacent pipe 38. The cantilever 33 and the alternative bridge member are generally examples of a closure member configured to be able to flex under the force applied by a displacement member such as SMA wire 34. In a general aspect, the shape memory alloy wire 34 exemplifies a tension wire connected to and extending between a closure member such as the cantilever 33 and a main body of the PCB substrate 31, i.e. a portion of the substrate lying outside the aperture separate from any cantilever or bridge member extending into the aperture 32.

The fluid pipe 38 can be configured to lie in the plane of the PCB substrate 31 at the pinch point defined by nub 39 or could pass through the plane of the PCB substrate 31 at the pinch point defined by nub 39, either in an orthogonal or oblique direction relative to the plane of the PCB substrate.

The microvalve of FIG. 2 need not be of a normally-closed configuration. The cantilever 33 or other closure member and the wire 34 or other displacement member could be arranged to provide a normally-open configuration and operate to close or restrict the pipe when the displacement member is thermally actuated. In such an arrangement, the wire 34 can extend across the gap between the cantilever 33 and the closure edge 37 of the aperture to compress the pipe 38.

If a greater length of SMA wire 34 is required to provide sufficient thermal contraction, the end of the wire 34 can extend well past the closure edge 37 before being fixed to the substrate 31.

Figure 3:
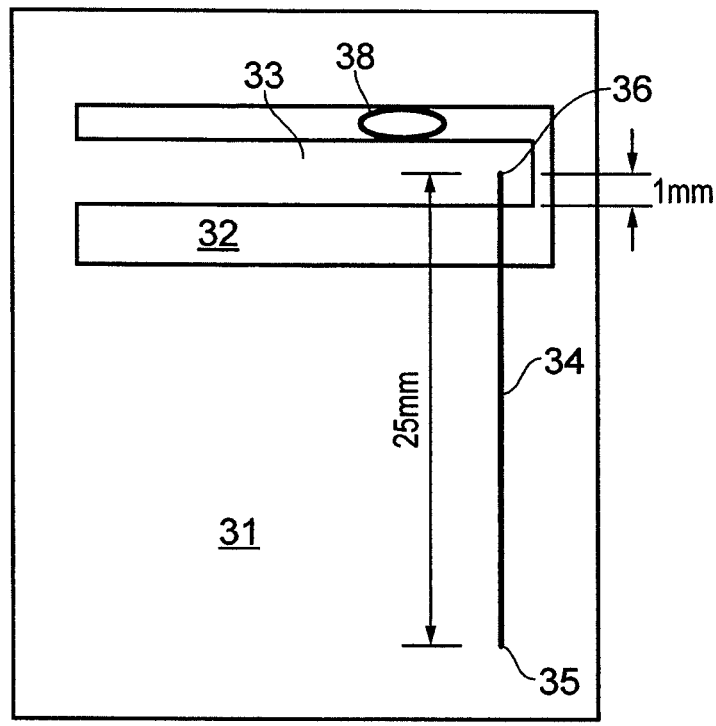
FIG. 3 is a schematic plan view of a microvalve similar to that of FIG. 2 but modified for smaller aperture size.

FIG. 3 illustrates a general method for ensuring sufficient length of SMA wire 34 to provide enough thermal contraction to effect full displacement of the cantilever 33. If the aperture 32 is too small to provide sufficient length of SMA wire 34 (or other displacement member), the wire 34 can be extended over not only the aperture 32 but also a length of substrate 31 to a connection point 35 somewhat remote from one edge of the aperture. In the example shown in FIG. 3, a 1 mm displacement of the cantilever 33 can be effected by a 25 mm length of shape memory wire 34, actuated at a typical actuation temperature of perhaps 70-90° C.

FIG. 3 also generally illustrates an example in which the fluid pipe 38 extends through the plane of the substrate 31, as discussed earlier.

Figure 4:
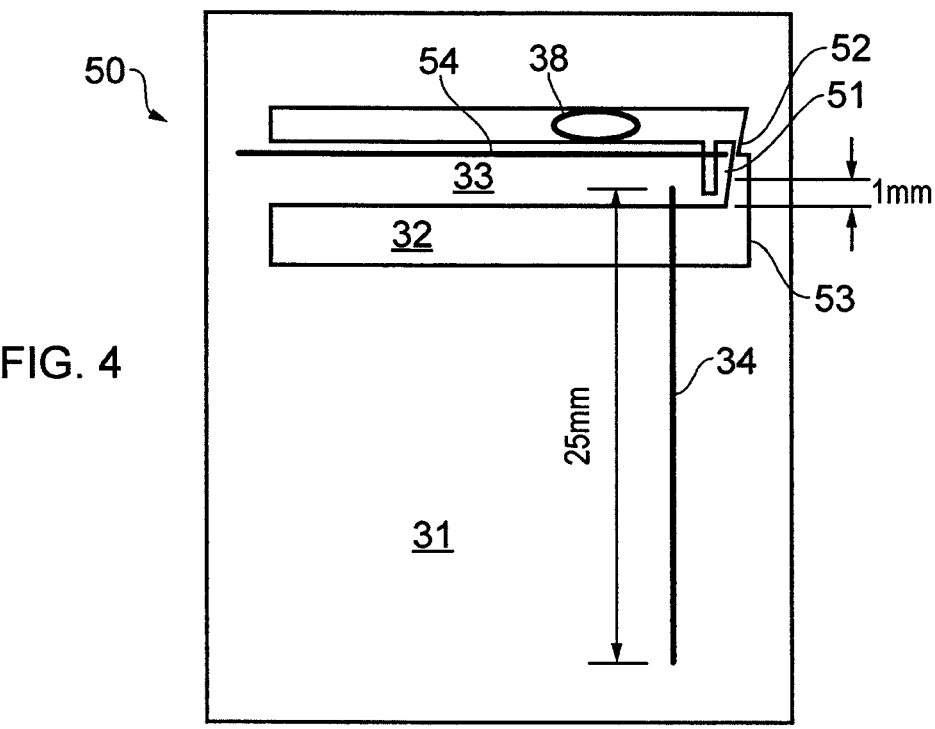
FIG. 4 is a schematic plan view of a latching microvalve.

FIG. 4 illustrates a modification to the arrangement of FIG. 3, showing an example of how to form the microvalve as a latching valve 50. In the example of FIG. 4, the microvalve 50 includes a cantilever 33 which includes a latch member 51 formed as a transverse cantilever. The latch member 51 is configured to engage with a tooth 52 extending outward from an edge 53 of the aperture 32. The latch member 51 is deflectable by way of a second shape memory alloy wire 54 in much the same way as described in connection with the shape memory alloy wire 34. More specifically, the wire 54 may be thermally actuated by passing an electrical current through it, so shortening the wire and displacing the latch member 51 to disengage from the tooth 52. In this way, the example of FIG. 4 shows a normally closed valve 50 i.e. when the cantilever 33 is unbiased, which valve can be opened using thermal actuation of wire 34, and which will latch open by engagement of latch member 51 against tooth 52. The thermal actuation of wire 34 can then be discontinued. When the microvalve 50 is to be closed, the second SMA wire 54 is thermally actuated causing the latch member 51 to deflect away from the aperture edge 53 and disengage from the tooth 52 so that the cantilever 33 returns to its unbiased configuration.

Figure 5:
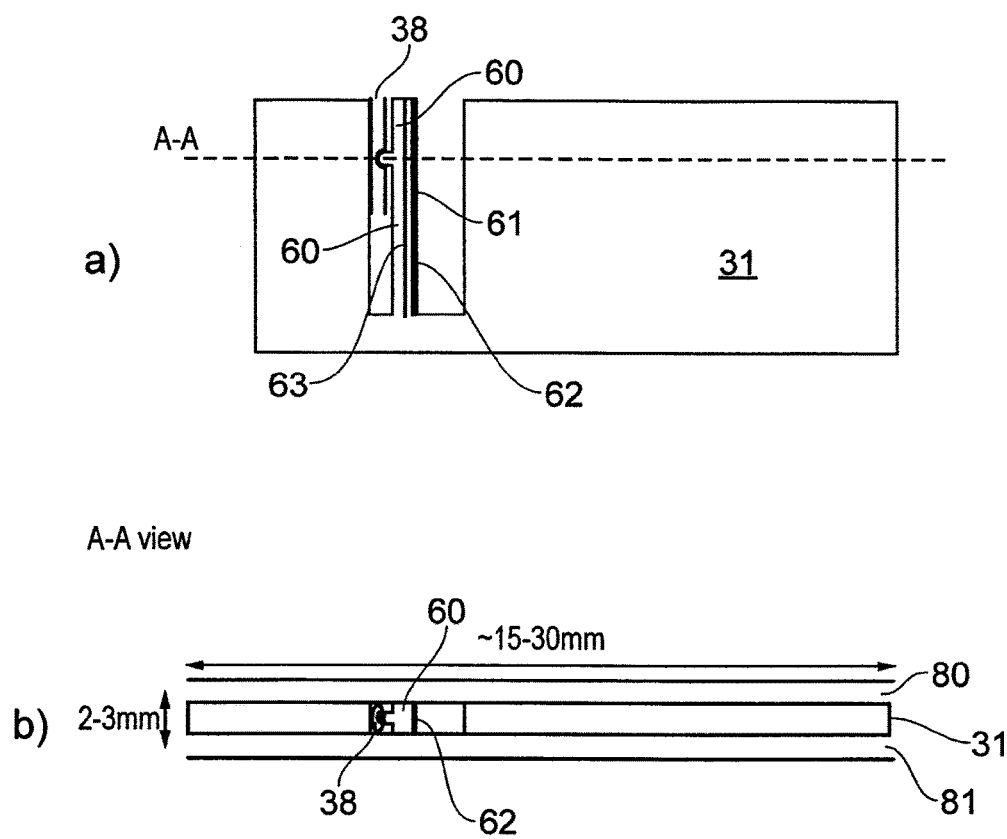

Other forms of thermal actuation of the cantilever member 33 (or other closure member) are possible. With reference to FIG. 5, instead of using a shape memory alloy wire 34, the cantilever 60 may include an edge 61 which is plated with a suitable metal 62 having a thermal coefficient of expansion which is different from the thermal coefficient of expansion of the cantilever material (e.g. the PCB substrate material). A metallic strip or wire 63 disposed on the cantilever is operable as a heating element to heat the cantilever and thereby cause differential expansion of the materials and consequently cause cantilever deflection. In this way, the cantilever may be operated in a similar manner to a bimetallic strip actuator according to known principles. For example, the edge 61 may be plated with gold, copper or nickel.

Other forms of latching mechanism may be envisaged. For example, as shown in FIG. 6, a microvalve 70 comprises an encapsulated heater element 71 which is surrounded by a low melting temperature metal 72, such as Field's metal or Wood's metal, in a flexible capsule 73 positioned between the cantilever 33 and a bearing edge 74 of the aperture 32. The capsule may be formed of a suitable elastomeric polymer such as PDMS (polydimethylsiloxane). The heater element 71 may be a copper coil. The heater element 71 may be actuated by electrical current delivered by electrically conductive tracks 40. The heater element 71 could alternatively be outside the capsule 73. If the heater element 71 is within the capsule, it may be insulated to prevent short circuit via the low melting temperature metal.

FIG. 6a shows the latching microvalve 70 in an unbiased, unlatched configuration. FIG. 6b shows the microvalve 70 in a latched condition. In use, the low melting temperature metal 72 may be heated using the heater element 71 before (and/or contemporaneously with) heating of the SMA wire 34. The low melting temperature metal 72 becomes molten (at approximately 62° C. or 70° C. respectively for Field's and Wood's metals) and therefore the flexible capsule 73 is able to reshape under the tension applied by the wire 34 to the cantilever 33. The heater element 71 is then deactivated causing the low melting temperature metal 72 to solidify again in the elongated shape (FIG. 6b). Thus, the cantilever 33 remains biased away from the fluid pipe 38 even when the shape memory alloy wire 34 is deactivated. In a preferred activation sequence, the low melting temperature metal is heated with heater element 71; the SMA wire is heated; the heater element 71 is deactivated while the SMA wire remains heated; the metal 72 solidifies; and the SMA wire heating is then deactivated.

The latch member 51 and tooth 52, and the flexible capsule 73 described above generally exemplify a latching mechanism which is configurable to retain the closure member (e.g. the cantilever 33) in its displaced condition independent of the thermal actuation state of the displacement member (e.g. SMA wire 34). The latching mechanism will retain the cantilever 33 in its displaced or deflected position even when the thermal actuation of the displacement member is ceased or switched off.

Other arrangements may be envisaged that do not require the use of a cantilever member 33 that can be deflected laterally from its axis, as shown in the preceding figures.

In the example shown in FIG. 7, a microvalve assembly 90 comprises an aperture 32 in the substrate 31. Extending into the aperture 32 is an axially compressible closure member 91 which extends from a proximal end 92 at an edge of the aperture 32 to a distal end 93 remote therefrom. The closure member 91 may be an integral part of the substrate 31 created during formation on the aperture 32 or may be attached to the substrate during manufacture. The axially compressible closure member 91 may be formed of any suitable compressible material such as an elastomeric material. The axially compressible closure member 91 could comprise a helical spring.

A shape memory alloy (SMA) wire 34 extends from the substrate 31 at connection points 35a, 35b around a connection point 36 at or close to the distal end of the closure member 91. The connection points can be any suitable type of mechanism for securing the wire 34 to the substrate 31 such as by soldered contacts or by the wire looping around a structure embedded in or attached to the substrate 31. The wire loop could be closed by a clamp or other mechanism. Electrically conductive tracks 40 extend across the substrate 31 to ends of the SMA wire 34 forming electrical connections thereto. Disposed between the distal end 93 of the closure member 91 and a closure edge 37 of Disposed between the distal end 93 of the closure member 91 and a closure edge 37 of the aperture 32 is a fluid conduit 38. The fluid conduit 38 is preferably a flexible pipe and can be compressed to restrict the flow of fluid through the pipe.

Like in previously described arrangements, the SMA 34 may have a negative thermal coefficient of expansion in that it contracts significantly as its temperature rises, e.g. by electrical current heating. Thus, as it contracts, the closure member 91 is axially compressed so that it moves, from its non-actuated configuration (FIG. 7a) in which the fluid conduit 38 is compressed and occluded, to its actuated configuration (FIG. 7b) in which the fluid conduit 38 is not compressed and therefore not occluded.

As with previously described embodiments, the fluid pipe 38 can be configured to lie in the plane of the substrate 31 passing the pinch point defined by the closure edge 37 of the aperture and the distal end 93 of the closure member. Alternatively, the fluid pipe 38 can be configured to pass through the plane of the substrate 31 at the pinch point defined by the closure edge 37 of the aperture and the distal end 93 of the closure member. Other features of the previously described embodiments can also be applied to the arrangement of FIG. 7.

All of the microvalves described above can be implemented substantially within the plane of the printed circuit board substrate 31, thus providing a very low profile microvalve suitable for sandwiching into the stacked plates of a fuel cell stack such as shown in FIG. 1. If necessary, the shape memory alloy wires 34, 54 and/or their connection points 35, 36 can be recessed slightly below the main or major surface 41 (see FIGS. 2c, 2d) of the substrate 31. The cantilever member 33 can be made slightly thinner or lower profile than the substrate 31 to ensure there is no binding against layers stacked onto the printed circuit board. The printed circuit board substrate 31 can be overlaid with, or sandwiched between cover or capping layers 80, 81 as shown in FIGS. 2c and 2d and FIG. 5.

The microvalve can be configured such that the movement of the closure members (e.g. cantilever member 33 or a bridge member) and the movement of the displacement members (e.g. shape memory alloy wires 34, 54) occurs entirely within the plane of the PCB substrate 31 thereby requiring no moving parts to extend out of the plane of the substrate 31. This provides a very low profile microvalve ideally suited to the stacked plates of the fuel cell stack 1.

The actuation temperatures of the displacement members of the microvalves described can be made compatible with a normal operating temperature of a fuel cell stack. Typical temperatures found near the end plates 13, 14 of the fuel cell stack 1 may be of the order of 50° C. and wire actuation temperatures can be in the range of 70-90° C.

Various safety cut-out mechanisms may be integrated with the microvalve. For example, to provide a fail safe in the event of overheating of the fuel cell stack, which might otherwise maintain a hydrogen microvalve in an unsafe open condition by continuous actuation of wire 34, one or more thermal (melt) fuses could be incorporated into the wire 34 which could melt thereby breaking the tension in the wire and forcing a valve closure.

Returning now to FIG. 1, it can be seen that the microvalves described above can be integrated into the printed circuit board current collector plates 9 and/or 11 thereby requiring little or no increase in dimensions of the fuel cell stack. The microvalve apertures 32 can be positioned in the collector plate end sections 23, 24 aligned with the ports 19, 20 so that a hydrogen fuel pipe extending therethrough can be positioned to pass through the microvalve assembly.

The principle of using a printed circuit board incorporating a microvalve as described herein can be applied to other types of fuel cell stack, such as a closed-cathode fuel cell stacks in which an oxidant pipe may also be flow controlled. The microvalves can also be used to control purge lines, and in particular anode purge lines. The normally-closed configuration of microvalve can be particularly useful to automatically isolate the hydrogen flow paths within the cells of the fuel cell stack from external ambient when the fuel cell is disconnected from a fuel source.

The use of a printed circuit board which combines a current collector plate 9, 11 with valves provides significant benefits in modularity and design changes. The patterns of electrical conductivity and valve layout required of the current collector plate for any type of stack assembly can readily be altered using highly efficient and well-established PCB manufacturing techniques, and can be adapted for different configurations of anode or cathode flow plates 4, 5 and different external connections. They are highly suited to volume manufacture and assembly and are highly cost effective. Standard PCB connector arrangements can be used for electrical connections.

Any suitable material may be used for fabricating the printed circuit board used as substrate 31, including all conventional PCB materials such as cloth, textile, fibre or paper layers impregnated in resins or other thermosetting dielectric materials, suitable for printing or otherwise applying electrically conductive materials, or laminates having copper or other conductive layers already applied for suitable etching and removal where not required. Other substrate materials (e.g. non-PCB materials) may be considered, however, for supporting the various elements of the valve assembly described above. These could include plastics, dielectric materials etc.

The microvalve assembly described here is particularly suited to small-scale fuel cell stacks with few cells, such as those that can be used in consumer electronic devices.

However, the principle can be applied to larger fuel cell stacks. Further, the microvalves described here can be generally used in many types of device other than fuel cells.

The displacement member could include multiple tension wires 34 to increase the possible tension applied to the closure member (e.g. cantilever 33). The wires could stretch back and forth between the main body of the PCB substrate and the cantilever.

The microvalve described can be configured to operate not only between fully open and fully closed fluid pipe configurations, but may also operate with partially open configurations. This could be achieved by enabling reduced heating of the SMA wires, for partial contraction. In this way, the microvalve may be configured to operate as a variable pressure regulator. Such a functionality could be implemented not only with analogue control of the thermal actuation of the displacement member, but alternatively by digital control of the thermal actuation, to implement a pulse-width modulation of the open-closed configurations.

Other embodiments are intentionally within the scope of the accompanying claims.

The invention claimed is:

1. A valve assembly comprising:
a substrate having a plane;
an aperture in the substrate including a closure member, the closure member being an elongated cantilever member having a first end and a second end, the first end affixed to the substrate separated by the cantilever member and the closure member having a second end extending into the aperture;
a flexible fluid pipe disposed between the closure member and a closure edge of the aperture;
a displacement member coupled to the substrate and configured for thermal actuation to displace the closure member laterally in the plane of the substrate so as to vary the cross-sectional profile of the flexible fluid pipe, wherein the displacement member comprises a tension wire connected to and extending between the second end of the closure member and a main body of the substrate; and
a nub having an unchanging shape disposed on the closure member between the first end and the second end of the closure member and between the closure member and the closure edge of the aperture.

2. The valve assembly of claim 1 in which the substrate is a printed circuit board substrate.

3. The valve assembly of claim 1 in which the closure member is an axially compressible member extending into the aperture.

4. The valve assembly of claim 1 in which the displacement member is configured for thermal actuation to displace the closure member so as to open and close a lumen of the flexible fluid pipe.

5. The valve assembly of claim 1 in which the tension wire is configured to vary its length as a function of temperature.

6. The valve assembly of claim 5 further including electrically conductive tracks extending along the substrate to the tension wire, to form an electrical connection therewith.

7. The valve assembly of claim 5 in which the tension wire comprises a shape memory alloy.

8. The valve assembly of claim 6 in which the displacement member is configured to shorten in length upon heating by electrical current passing therethrough.

9. The valve assembly of claim 1, wherein the nub compressing the flexible fluid pipe into a closed or partially closed configuration when the closure member is in an unbiased configuration.

10. The valve assembly of claim 1 configured such that thermal activation of the displacement member biases the closure member away from the closure edge of the aperture such that pressure on the flexible fluid pipe is relieved and the pipe adopts an open configuration.

11. The valve assembly of claim 1 configured such that the displacement of the closure member to vary the cross-sectional profile of the flexible fluid pipe occurs entirely within the plane of the substrate.

12. The valve assembly of claim 11 configured such that movement of the displacement member to displace the closure member occurs entirely within the plane of the substrate.

13. The valve assembly of claim 1 in which the closure member and/or the displacement member is/are recessed below a major surface of the substrate.

14. A fuel cell stack comprising an anode or cathode feed conduit for delivery of fuel or oxidant to cells in the stack, the feed conduit passing through a valve assembly according to claim 1 disposed within the stack, to control flow of fuel or oxidant to the cells within the stack.

15. The fuel cell stack of claim 14 in which the valve assembly is integrated into a printed circuit board forming a current collector plate of the fuel cell stack.

16. The valve assembly of claim 1 further including a latching mechanism configurable to retain the closure member in the laterally displaced condition independent of the thermal actuation state of the displacement member.

17. The valve assembly of claim 6 in which the tension wire comprises a shape memory alloy.

18. The valve assembly of claim 7 in which the displacement member is configured to shorten in length upon heating by electrical current passing therethrough.

* * * * *